(12) United States Patent
Shulman et al.

(10) Patent No.: US 12,418,599 B2
(45) Date of Patent: Sep. 16, 2025

(54) CLOUD-SERVICES MANAGEMENT TOOLS

(71) Applicant: Anantyx LLC, Reston, VA (US)

(72) Inventors: Paul Shulman, Reston, VA (US); Konstantin Girkhovskiy, Reston, VA (US)

(73) Assignee: ANANTYX LLC, Reston, VA (US)

( * ) Notice: Subject to any disclaimer, the term of this patent is extended or adjusted under 35 U.S.C. 154(b) by 16 days.

(21) Appl. No.: 18/394,834

(22) Filed: Dec. 22, 2023

(65) Prior Publication Data

US 2025/0016250 A1    Jan. 9, 2025

Related U.S. Application Data

(60) Provisional application No. 63/512,451, filed on Jul. 7, 2023.

(51) Int. Cl.
*H04L 67/75* (2022.01)
*G06F 3/0482* (2013.01)
(Continued)

(52) U.S. Cl.
CPC ............ *H04L 67/75* (2022.05); *G06F 3/0482* (2013.01); *G06Q 30/0283* (2013.01); *H04L 12/1421* (2013.01)

(58) Field of Classification Search
CPC ... H04L 67/75; H04L 12/1421; G06F 3/0482; G06Q 30/0283
See application file for complete search history.

(56) References Cited

U.S. PATENT DOCUMENTS 8,243,742 B2    8/2012  Forsberg et al.
10,972,567 B2*  4/2021  Luo ..................... H04L 67/561
(Continued)

FOREIGN PATENT DOCUMENTS

EP      3072260 B1    10/2019

OTHER PUBLICATIONS

Wei-Tek Tsai* et al., Service Oriented Cloud Computing Architecture, 2010 Seventh International Conference on Information Technology, 2010, pp. 684-689, Department of Computer Science and Technology, Tsinghua University, Beijing, China.

*Primary Examiner* — Kamal M Hossain
(74) *Attorney, Agent, or Firm* — Vorys, Sater, Seymour and Pease, LLP

(57) ABSTRACT

In some examples, a cloud-services management tool for managing cloud services of an entity includes a processor and a storage device communicatively coupled to the processor. The storage device stores computer-executable instructions, which, when executed by the processor, cause the processor to cause, via a display device, display of a user interface including one or more lists of available technology resources based on a user of the entity, receive, via a network interface, a user selection including at least one technology resource from the one or more lists of available technology resources, determine the at least one technology resource is provided by at least one cloud-service provider of a list of cloud-service providers, the list of cloud-service providers a list of cloud-service providers authorized by the entity, and manage the at least one technology resource provided by the at least one cloud-service provider based on the user selection.

20 Claims, 12 Drawing Sheets

(51) Int. Cl.
*G06Q 30/0283* (2023.01)
*H04L 12/14* (2024.01)

(56) References Cited

U.S. PATENT DOCUMENTS

| | | | |
|---|---|---|---|
| 2015/0006223 A1* | 1/2015 | Leslie | G06Q 10/1097 705/26.62 |
| 2019/0045018 A1* | 2/2019 | Pogrebinsky | G06F 3/0482 |
| 2024/0095095 A1* | 3/2024 | Derbenwick Miller | G06Q 10/063 |

* cited by examiner

CLOUD-SERVICES MANAGEMENT TOOLS

CROSS-REFERENCES TO RELATED APPLICATIONS

This application claims the benefit of U.S. Provisional Patent Application No. 63/512,451, filed on Jul. 7, 2023, which is incorporated by reference herein in its entirety.

FIELD OF THE DISCLOSURE

The technical field relates generally to cloud-based service operations and cloud-services management tools.

BACKGROUND OF THE DISCLOSURE

Digital modernization calls for revolutionizing cloud access and management by providing an intuitive and simple user experience, offering users what they need, when they need it. Cloud enablement technical solutions should address the needs of a broad spectrum of technology users from advanced business technologists to occasional users, from innovators to late adopters. The need for nimble access to technology resources requires enterprises to fundamentally rethink responsibilities and accountabilities for managing and governing their enterprise's technology estate.

Existing cloud-services management tools are developed and intended to support information technology (IT) cloud professionals, require a deeper than fundamental knowledge of cloud services, and do not address disciplines of cloud governance. Furthermore, different cloud providers use proprietary terminology that calls for additional specialization of technology professionals to enable cloud adoption. Costing and pricing features of cloud-services management tools provide data that reflect networking and cloud component structure, but not business organizational charts or charts of accounts.

As a result, these tools are not promoting rapid cloud adoption and preclude organizations from unlocking the mission value of the cloud. This challenge requires an innovative technical approach to solve the problem of technology democratization, scalability, and sustainability.

SUMMARY OF THE DISCLOSURE

Computer-implemented methods, systems, and computer-readable storage medium are provided for cloud-based service operations and, more particularly, to cloud-services management tools.

According to an embodiment consistent with the present disclosure, a cloud-services management tool for managing cloud services of an entity includes a processor, a storage device communicatively coupled to the processor, the storage device to store computer-executable instructions, which, when executed by a processor, cause the processor to cause, via a display device, display of a user interface including one or more lists of available technology resources based on a user of the entity, receive, via a network interface, a user selection including at least one technology resource from the one or more lists of available technology resources, determine the at least one technology resource is provided by at least one cloud-service provider of a list of cloud-service providers, the list of cloud-service providers a list of cloud-service providers authorized by the entity, and manage the at least one technology resource provided by the at least one cloud-service provider based on the user selection.

In another embodiment consistent with the present disclosure, a computer-implemented method for managing cloud-services of an entity includes causing, via a display device, display of a user interface including one or more lists of available technology resources based on a user of the entity, receiving, via a network interface, a user selection including at least one technology resource from the one or more lists of available technology resources, determining, with at least one processor, the at least one technology resource is provided by at least one cloud-service provider of a list of cloud-service providers authorized by the entity, and managing, with at least one processor, the at least one technology resource provided by the at least one cloud-service provider based on the user selection.

According to another embodiment consistent with the present disclosure, a non-transitory computer-readable medium is configured to store computer-executable instructions, which, when executed by a processor, cause the processor to cause, via a display device, display of a user interface including one or more lists of available technology resources based on a user of an entity, receive, via a network interface, a user selection including at least one technology resource from the one or more lists of available technology resources, determine the at least one technology resource is provided by at least one cloud-service provider of a list of cloud-service providers, the list of cloud-service providers a list of cloud-service providers authorized by the entity, and manage the at least one technology resource provided by the at least one cloud-service provider based on the user selection.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
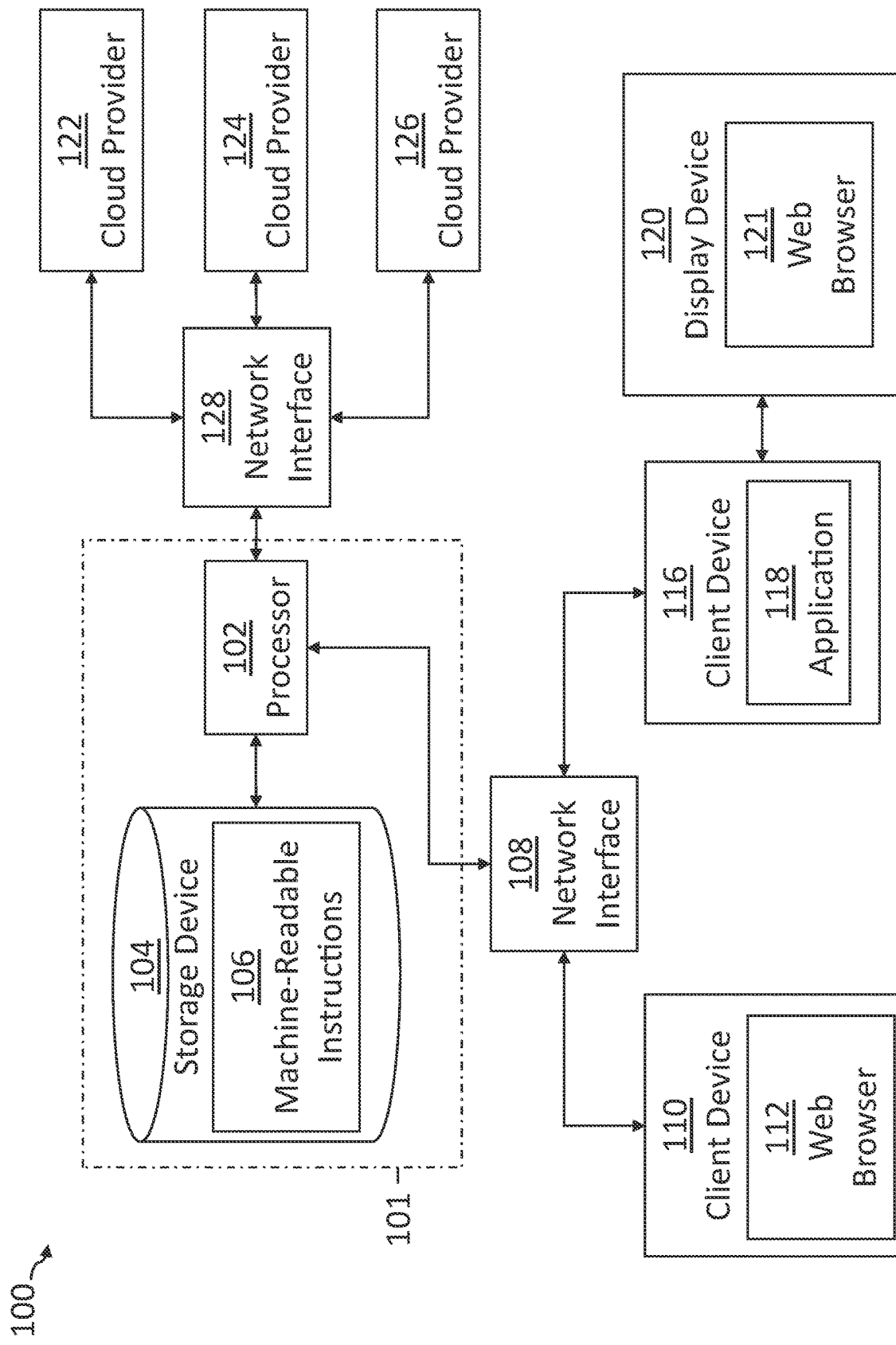
FIG. 1 is a block diagram of a system for a cloud-services management tool in accordance with certain embodiments.

Embodiments of the present disclosure relate to cloud-based service operations and, more particularly, to a self-service user interface for universal cloud-based service management tools. In certain embodiments, a system and method are disclosed herein for interactively providing a business (e.g., non-IT) worker, technology worker, or other specified users with menu driven choices on a user interface with a purpose of facilitating provisioning, using, budgeting, and cost tracking of cloud services offered by multiple cloud-service providers, allowing cloud-services management on a self-service basis. The user interface can allow authorized users to access digital services and tools on-demand with limited knowledge of cloud technologies. The user interface can be driven by selection choices and security that can be governed and maintained by IT cloud professionals. Selection choices can be presented in cloud native terms or business friendly terms with additional help and explanation information. The user interface can allow direct access to provisioned and managed cloud resources without switching to other access tools and protocols.

The systems and methods described herein can facilitate cloud management self-service capabilities through a user interface, such as a user web interface. The user web interface can overcome problems of the prior art by enabling non-IT users (e.g., business users) to access (e.g., provision and/or otherwise utilize or consume) cloud services that otherwise are managed exclusively by IT cloud professionals (i.e., IT). The user web interface can present cloud brand-specific terms in an abstract term that apply to similar services provided by different cloud-service providers. The non-IT users can utilize cloud services without depending on IT to provision and/or scale these services. Further, the systems and methods disclosed herein can provide IT with the ability to impose governing standards and security measures to the system ensuring IT standards and policies. This approach can extend the use of existing and future cloud services and provide self-service functionality to a non-IT user without requiring the non-IT user to become a cloud professional.

Embodiments refer to illustrations described herein with reference to particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

System

FIG. 1 is block diagram of a system 100 for a cloud-services management tool 101 in accordance with certain embodiments. The cloud-services management tool 101 includes a processor 102 communicatively coupled to a storage device 104. The storage device 104 stores computer-executable instructions, which, when executed by the processor 102, cause the processor 102 to manage cloud services of one or more entities. An "entity," as used herein, indicates an organization including one or more users engaged in a common activity, such as a business, trade, educational institution, government, charity, non-profit, partnership, cooperative, or other like venture. One or more client devices 110, 116 may be communicatively coupled to the cloud-services management tool 101, and one or more cloud providers 122, 124, 126 may be communicatively coupled to the cloud-services management tool 101. A user may use the cloud-services management tool 101 to manage services provided by the one or more of the cloud providers 122, 124, 126 via a user interface. The user interface may be a user interface as described with respect to one or more of FIGS. 3-12, for example. The user interface may also be referred to as graphical user interface (GUI). The GUI may be displayed via a web browser 112, 121 of a client device 110, 116, for example.

Cloud-services management tool 101 can be any type of online platform including, but not limited to, a software as a service (SaaS) or other platform. Cloud-services management tool 101 including its components (processor 102, storage device 104, machine-readable instructions 106) may be implemented on one or more servers at the same or different locations. The cloud-services management tool 101 may be implemented using one or more application programming interfaces (APIs) as needed to access different services to perform operations as described herein. For example, cloud-services management tool 101 may use APIs to make calls to and send and retrieve data from cloud providers 122-126. Cloud-services management tool 101 may be communicatively coupled to one or more web servers supporting World Wide Web services, communication protocols, or standards.

Processor 102 may use a single, dual, or other multi-processor architecture. The processor 102 may include one or more of a microprocessor, a microcontroller, an embedded processor, a digital signal processor (DSP), a central processing unit (CPU), a graphics processing unit (GPU), a neural processing unit (NPU), a vision processing unit (VPU), a field-programmable gate array (FPGA), a quantum processor, an application-specific integrated circuit (ASIC), or other like units for processing computer-executable (e.g., machine-readable) instructions.

Storage device 104 employ any computer-executable or -readable medium, and any computer-executable or -readable storage medium known now or in the future. Examples of computer-executable or computer-readable mediums include, but are not limited to, primary storage devices (e.g., any type of random-access memory (RAM), secondary storage devices (e.g., hard drives, floppy disks, compact disc-read only memory (CD-ROM), tapes, magnetic storage devices, optical storage devices, micro-electromechanical systems (MEMS), nano-technological storage devices, solid-state drives, flash memory, read-only memory (ROM), memory cards, secure digital (SD) cards, etc.), and communication mediums (e.g., wired and wireless communications networks, local area networks (LANs), wide area networks (WANs), intranets, etc.). Computer-executable or computer-readable mediums can include any form of transitory (which include signals) or non-transitory (which exclude signals) media. Non-transitory media comprise, by way of a non-limiting example, the aforementioned physical storage devices (e.g., primary and secondary storage devices).

Client devices 110, 116 can be any type of computing device including, but not limited to, a smartphone, laptop, desktop, tablet, workstation, or other computing device having at least a processor and a computable-readable memory. The computing device may have an operating system as would be apparent to a person skilled in the art given this description. The computing devices may include integrated display devices (e.g., client device 110) or may be communicatively coupled to the display device (e.g., display device 120). The display device may display the web browser 112, 121, for example. Web browser 112, 121 may be any type of browser including, but not limited to, a SAFARI browser from APPLE INC, CHROME browser from GOOGLE LLC or EDGE browser from MICROSOFT INC. Application 118 may be a standalone application or may operate as a web application with web browser 121. For example, application 118 may be downloaded by a user from an application store or other site. Similarly, a web application with browser 112 may be accessed by directing the web browser to a portal page or other entry page allowing the user to access cloud-services management tool 101. For clarity, the term online application is used to refer to either application 118 or a web application supported by the web browser 112.

Cloud providers 122, 124, 126 provide on-demand, scalable computing resources, such as computer processing, data storage, applications over the internet, or the like. Cloud providers 122, 124, 126 may be any cloud-service providers (CSPs), IT companies, or other like businesses providing on-demand, scalable computing resources including, but not limited to, GOOGLE CLOUD, MICROSOFT AZURE, AMAZON WEB SERVICES (AWS). Cloud providers 122, 124, 126 may provide services such as infrastructure as a service (IaaS), SaaS, platform as a service (PaaS), or other like IT services. The cloud-services management tool 101 enable client devices 110, 116 direct, simultaneous access to the cloud providers 122, 124, 126 without a user having to switch between access tools and protocols specific to each cloud provider.

Network interfaces 108, 128 provide logical connections for one or more remote computing devices to connect to a public or private network. The networks can be a LAN, WAN, or the internet, for example. Network interfaces 108, 128 may include one or more of a modem, a router, a network interface card (NIC), an access point, a switch, computer-executable instructions, other like components for providing logical connections to a network, or a combination thereof. Network interfaces 108, 128 may be internal or external to the computing devices communicating via the logical connections. One or more computing devices may be coupled to network interfaces 108, 128 via a wired connection (e.g., Ethernet) or a wireless connection (e.g., Wi-Fi).

Operation

Figure 2:
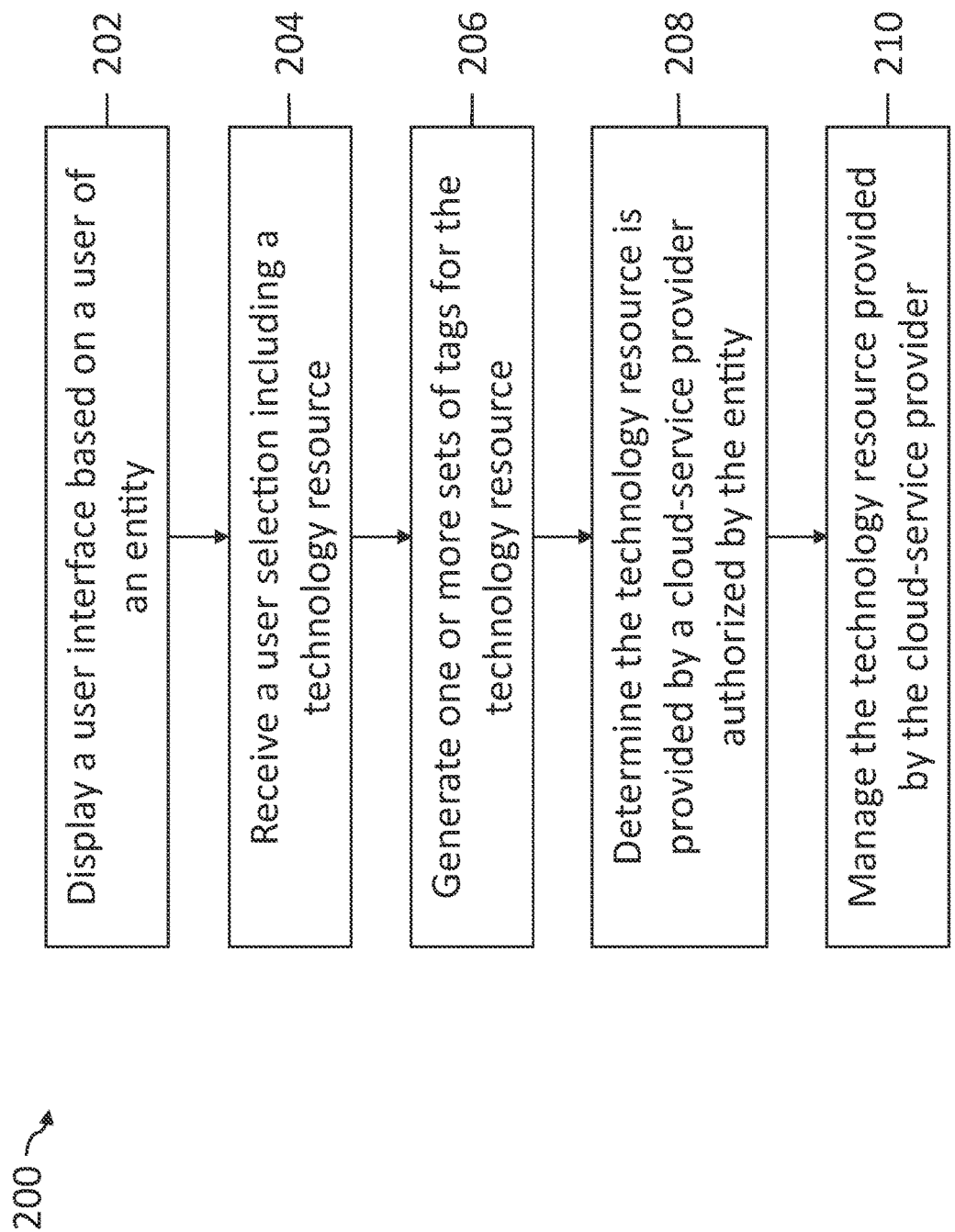
FIG. 2 is a flow diagram of a method for a cloud-services management tool, in accordance with certain embodiments.

FIG. 2 is a flow diagram of a computer-implemented method 200 for a cloud-services management tool, in accordance with certain embodiments. The cloud-services management tool may be the cloud-services management tool 101 described with respect to FIG. 1, for example. The computer-implemented method 200 may be performed by a processor (e.g., processor 102) executing one or more computer-readable instructions (e.g., machine-readable instructions 106) stored to a storage device (e.g., storage device 104).

At step 202, the computer-implemented method 200 includes causing, via a display device (e.g., display device 120), display of a user interface based on a user of the entity. The user interface may be displayed in a web browser (e.g., web browser 112, 121), for example. In a non-limiting example, the user interface for a user at a first entity may be different than the user interface for a user at a second entity.

In certain embodiments, the display device may display a user interface including one or more lists of available technology resources based on a user of the entity. In a non-limiting example, the one or more lists of available technology resources may include one or more of specified machine images, database setups, specified cloud services, or a combination thereof. A machine image, as used herein, is an image, or file, which specifies a configuration for a virtual machine having one or more of a virtual memory and a bootable operating system. The machine image may include, but is not limited to, data describing a container format, a disk format, or other like metadata, or properties, describing the virtual machine. A database setup, as used herein, is an image, or file, which specifies a configuration for a database, or describes how a collection of data is organized. The database setup may include, but is not limited to, data describing a type of database (e.g., relational, object-oriented, distributed, data warehouse, nonrelational, graph, open source, multimodel, document, self-driving). A cloud service, as used herein, is a service that an entity has agreed to have provided by a cloud provider (e.g., the cloud provider 122, 124, 126). Each cloud provider may utilize different terminology, such as proprietary language or cloud brand-specific terms, to describe machine images, database setups, or services.

At step 204, the computer-implemented method 200 includes receiving, via a network interface (e.g., the network interface 108), a user selection including at least one technology resource from the one or more lists of available technology resources. The user may use an input device (e.g., mouse, touchpad, touchscreen, microphone or other like input device) to select an option from a menu of options such as described with respect to one or more of FIGS. 3-12, for example.

At step 206, the computer-implemented method 200 includes generating, by the processor, one or more sets of tags for the technology. In various embodiments, the computer-implemented method 200 includes generating a first set of tags and a second set of tags for the at least one technology resource. In a non-limiting example, the first set of tags is specified by the entity and the second set of tags is based on terminology of the at least one cloud-service provider. For example, the entity may specify tags using terminology that is in common use or considered plain language (e.g., "CPU", "memory," computer name determined by the entity, or database name determined by the entity).

At step 208, the computer-implemented method 200 includes determining, by the processor, that the at least one technology resource is provided by at least one cloud-service provider of a list of cloud-service providers authorized by the entity. In certain embodiments, the computer-implemented method 200 includes comparing the at least one technology resource to one or more of specified machine images, database setups, or specified cloud services provided by each cloud-service provider of the list of cloud-service providers authorized by the entity to determine the at least one cloud-service provider. In a non-limiting example, in response to a determination that multiple cloud-service providers of the list of cloud-service providers provides the at least one technology resource, the computer-implemented method 200 may include determining a cloud-service provider of the multiple cloud-service providers providing the at least one technology resource for a lower cost than the other cloud-service providers of the multiple cloud-service providers. In another non-limiting example, in response to the determination that multiple cloud-service providers of the list of cloud-service providers provide the at least one technology resource, the computer-implemented method 200 may include determining the cloud-service provider of the multiple cloud-service providers that provides the at least one technology resource in compliance with a specified security parameter associated with the entity. The security parameter may be specified by a user having administrative privileges, for example.

At step 210, the computer-implemented method 200 includes managing, with at least one processor, the at least one technology resource provided by the at least one cloud-service provider based on the user selection. In certain embodiments, the computer-implemented method 200 includes transmitting one or more commands to the at least one cloud-service provider to manage the at least one technology resource using the tags based on terminology of the at least one cloud-service provider. Managing the at least one technology resource may include causing the at least one cloud-service provider to allocate (e.g., create, provide, allot, assign) the at least one technology resource, to deallocate (e.g., delete, release, unassign) the at least one technology resource, or to display data of the at least one technology resource via the user interface.

In various embodiments, the one or more lists of available technology resources includes a first list of available technology resources available from each cloud provider of the list of cloud-service providers and a second list of available technology resources utilized by the entity. The computer-implemented method 200 includes receiving, via the network interface, authenticating information of the user. The authenticating information includes user credentials such as a user name, password, or other identifying information. The computer-implemented method 200 includes determining a user access based on the authentication information. The computer-implemented method 200 includes causing, via the display device, display of the first list in response to the user access indicating a first access level or the second list in response to the user access indicating a second access level.

In a non-limiting example, the first access level may indicate that the user has administrative privileges and may manage the list of available technology resources available from each cloud provider. For example, administrative privileges may enable the user to add, delete, or modify one or more of the list of available technology resources specified in service agreements with each cloud provider. In some examples, the list of available technology resources for the user having administrative privileges may be displayed using terminology provided by the authorized cloud-service providers. In another non-limiting example, the second access level may indicate that the user has general privileges to add, delete, or modify the list of available technology resources specified by the entity. For example, general privileges may enable the user to add, delete, or modify an amount of CPU, memory, or a combination thereof allocated to a computer name or database name specified by the entity. In some examples, the list of available technology resources for the user having general privileges may be displayed using terminology provided by the entity.

Using the computer-implemented method 200 for managing cloud-services of an entity promotes rapid cloud adoption by enabling users without cloud-specific knowledge to manage cloud services. Displaying terminology provided by the entity presents users with common, business friendly terms that may include helpful as well as explanatory information. By removing barriers to access created by cloud-specific terminology requiring specialized knowledge of the cloud, the computer-implemented method 200 democratizes access to the technology. Removing dependence on IT professionals enables both scalability and sustainability of cloud services for the entity. Retaining specified privileges (e.g., administrative privileges) for IT professionals ensures maintenance of governing standards and security measures that comply with IT standards and policies of the entity.

Cloud-Services Management Tool User Interface

FIGS. 3-12 show examples of user interfaces that may be displayed to one or more users of the cloud-services management tool 101. For example, web browser 112 may display a GUI having multiple pages, tabs, pop-outs, or like components for outputting data of the cloud-services management tool 101. As indicated by like numbering, boxes, and arrows, one or more areas of web browser 112 may be called out and enlarged for readability purposes in each figure. Cloud-services management tool 101 may also receive data input by a user through the web browser 112. In one embodiment, cloud-services management tool 101 may be part of a secure enterprise system accessed through secure browsers 112, 121.

While the user-interfaces in FIGS. 3-12 are described for brevity primarily with respect to browser 112, the invention is not so limited and user-interfaces operating as described herein may also be provided for display on browser 121 through application 118. In still further embodiments, user-interfaces operating as described herein may also be provided for display in a separate stand-alone application on a client device without use of a browser.

Figure 3:
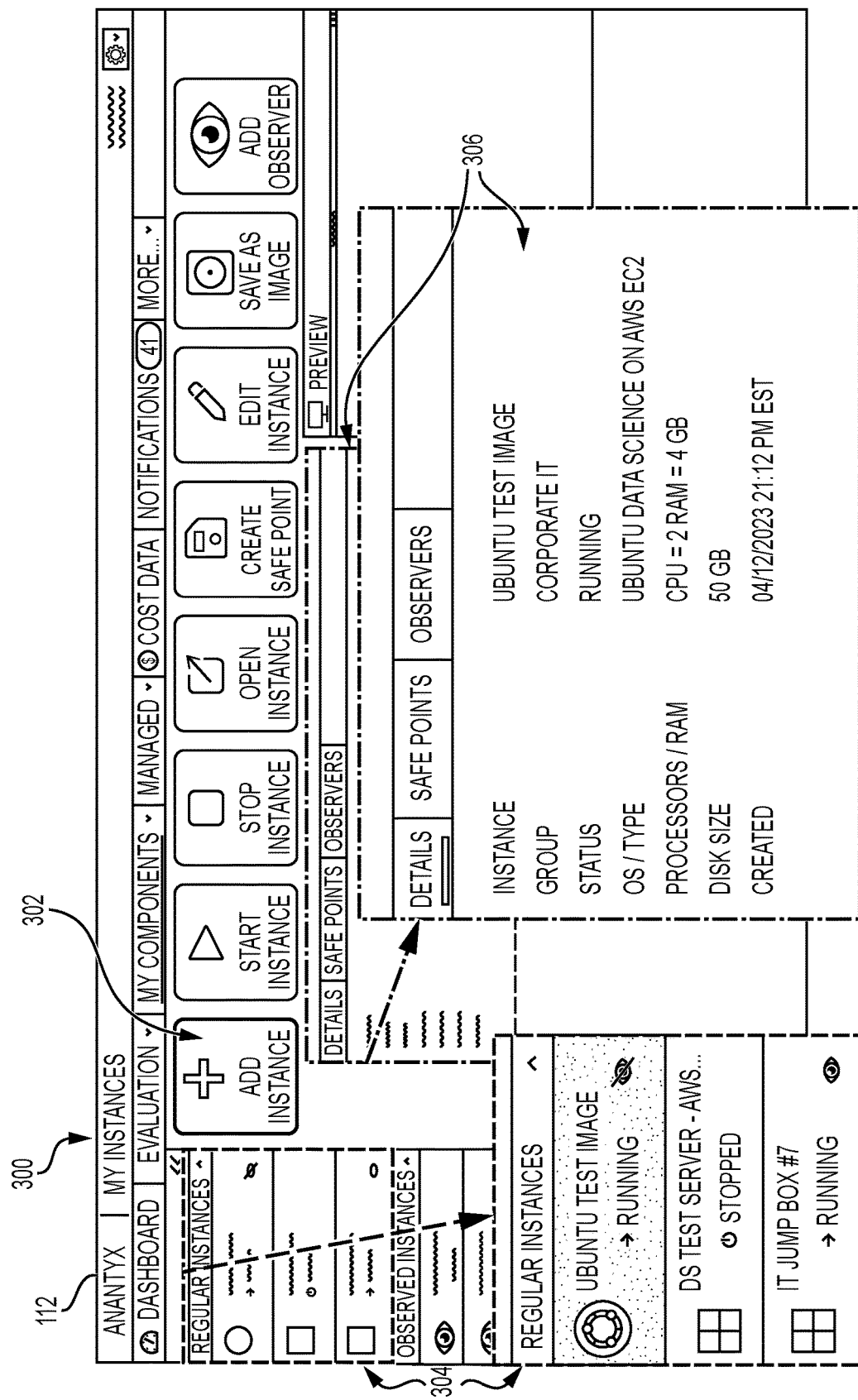
FIG. 3 is a diagram of a user interface for a cloud-services management tool, in accordance with certain embodiments.

FIG. 3 shows an example image of a GUI that may be displayed to one or more users accessing cloud-services management tool 101. As shown in FIG. 3, page 300 (such as a browser tab) may be displayed. Page 300 includes a dashboard for the cloud-services management tool 101. The dashboard may include different tabs that enable a user to access cloud services. The dashboard may include differently named tabs for different users of a single entity. The dashboard may include differently named tabs for different entities.

In certain embodiments, page 300 includes one or more interactive tabs or menu options (e.g., "Evaluation," "My Components," "Managed," "Cost Data," "Notifications," "More") that enable the user to access services of one or more of the cloud providers 122, 124, 126. In various embodiments, selecting a tab, such as "My Components," may provide a dropdown menu of a list of available technology resources to which the user has access. The user access may be based on an access level of the user, as indicated by login credentials, for example. The list of available technology resources may be displayed in terminology specified by the entity or in terminology provided by one or more of the cloud providers 122, 124, 126 authorized by the entity. The terminology may be based on the access level of the user, for example.

In a non-limiting example, the user may select "Instances" from the "My Components" dropdown menu. An instance may represent a virtual or physical server, container, or an edge device for performing a workload, for example. A container includes an operating system and provides a secure environment in which an application can execute. A virtual or physical server may host multiple containers, for example. An edge device is a device that provides an access point to an enterprise or cloud-service provider network, for example. In response to the user selection, page 300, "My Instances," may be displayed. Page 300 may include one or more buttons, or other like user interfaces, for selecting different options for managing instances (e.g., adding, starting, stopping, opening, creating safe point, editing, saving as image, adding observer). For example, button 302 enables the user to select one or more parameters for the instance via a pop-out menu 404 as described with respect to FIG. 4. Page 300 may include a list of instances that the user has access to in a menu 304. The menu 304 may include a name of each instance of the list of instances as well as a status (e.g., stopped, running) of the instance. The user may select an instance from the menu 304 to view details of the instance in a viewing area 306. The details displayed in the viewing area 306 may include the parameters for the instance, for example. The parameters may include a name, a group of the entity having access rights, a status, an operating system or machine image type, one or more parameters for a processor, a disk capacity, one or more of a date or a time when the datasource was created, or other like parameters. In a non-limiting example, the parameters displayed are specified by the entity.

Figure 4:
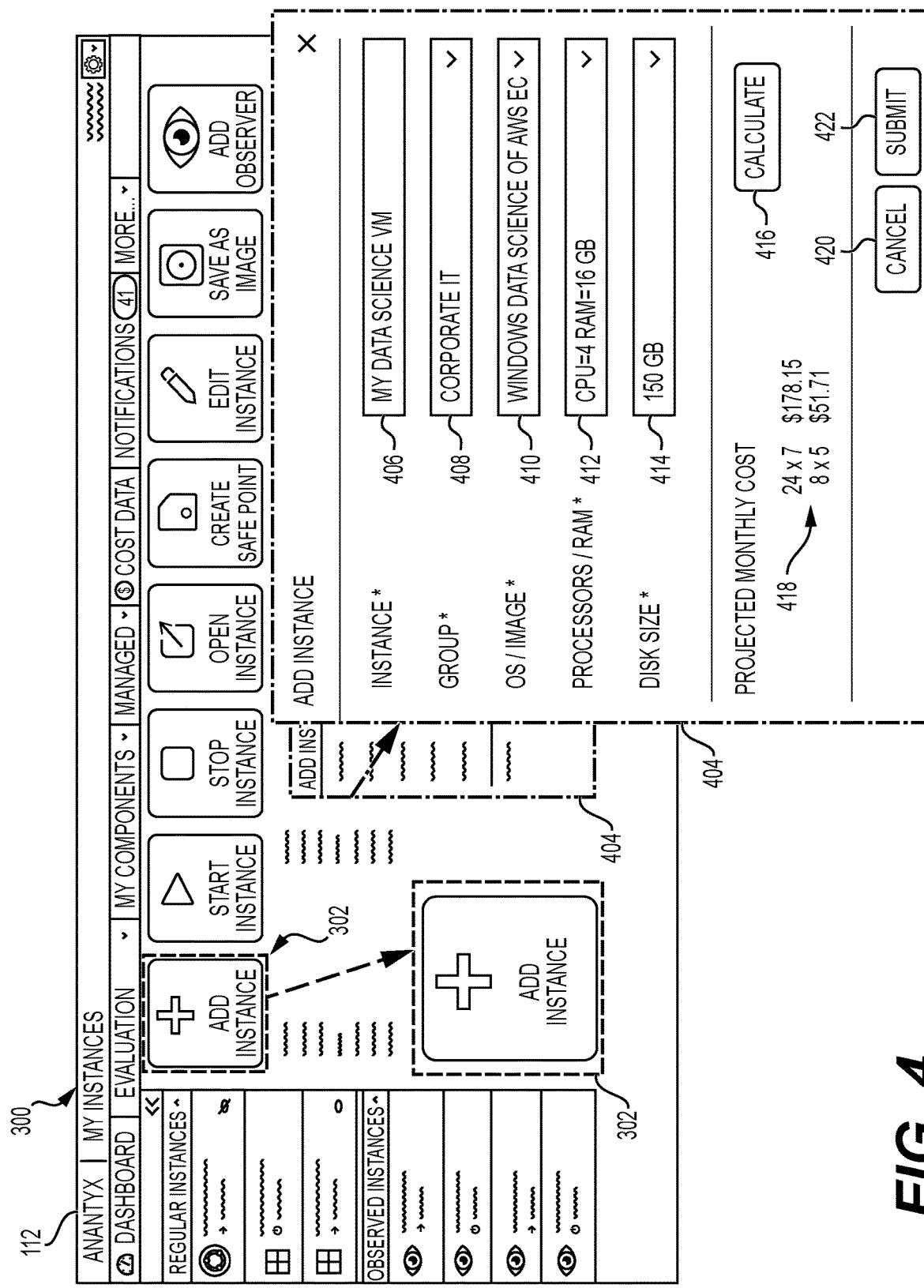
FIG. 4 is a diagram of a user interface for a cloud-services management tool, in accordance with certain embodiments.

FIG. 4 shows an example image of a GUI that may be displayed to one or more users accessing cloud-services management tool 101. As shown in FIG. 4, pop-out menu 404 may be displayed in response to the user selecting the button 302. The user may select one or more parameters for the instance using text boxes, dropdown menus, buttons, or other like interactive inputs. In a non-limiting example, the user may name the instance by typing into text box 406. Using dropdown menu 408, the user may select a group within the entity that has access to the instance. Dropdown menu 410 enables the user to select an operating system or machine image for the instance. Using dropdown menu 412, the user may select one or more characteristics of a processor, a capacity of RAM, or a combination thereof. Dropdown menu 414 may enable the user to select a disk capacity.

In certain embodiments, the user having administrative privileges may have access to different parameters in the pop-out menu 404 than the user having general privileges. In a non-limiting example, a first user may have administrative privileges resulting in use of terminology provided by the authorized cloud-service providers while a second user may have general privileges resulting in use of terminology specified by the entity. For example, the dropdown menu 410 shows options that are specific to a cloud provider, which may indicate that the user has administrative privileges. In another example, descriptions of the pop-out menu 404 may be in terminology specified by the entity for the user having general privileges (e.g., "Data Science VM" instead of "Instance," "Memory" instead of "Disk Size," clock frequency (e.g., GHz) instead of number of cores and RAM (e.g., "CPU=4 RAM=16 GB"), generic sizes (e.g., small, medium, large, x-large, SM, MED, LG, XL) instead of CPU and/or RAM).

In various embodiments, the user may use button 416 to calculate a projected monthly cost for the instance based on the parameters selected using one or more of the dropdown menus 408, 410, 412, 414. In response to the user clicking on button 416, the cloud-services management tool 101 determines a projected monthly cost of the instance. In a non-limiting example, the cloud-services management tool 101 causes display of the projected monthly cost. For example, the pop-out menu 404 may display the projected monthly cost in area 418. In certain embodiments, in response to the user selecting the button 420, "Cancel," the pop-out menu 404 is closed without any further action. In other embodiments, in response to the user selecting the button 422, "Submit," the cloud-services management tool 101 may generate a first set of tags and a second set of tags for the instance, where the first set of tags is specified by the entity and the second set of tags is based on terminology of the cloud provider providing the instance. In a non-limiting example, the cloud-services management tool 101 transmits a command including data of the second set of tags to the cloud provider to allocate the instance.

Figure 5:
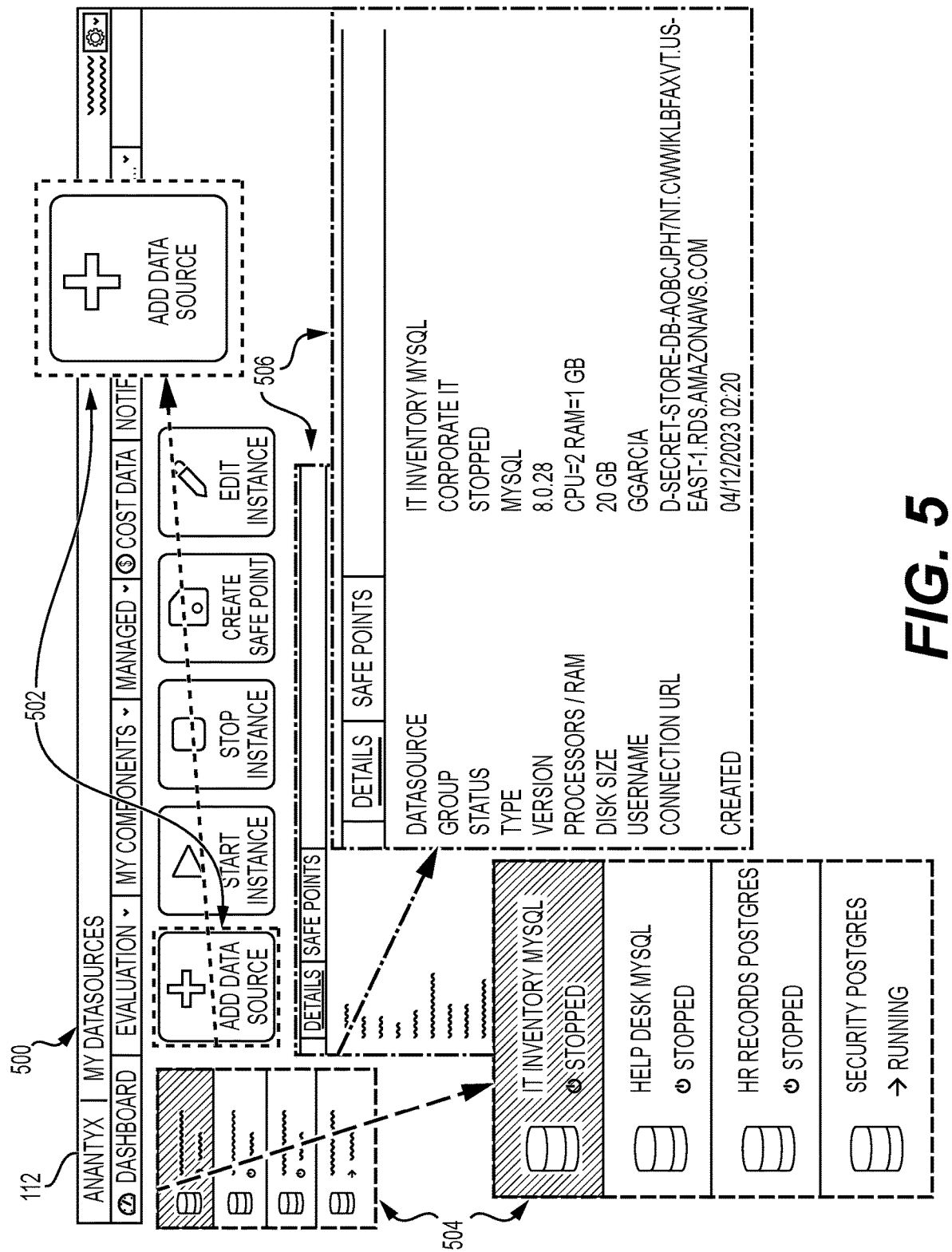
FIG. 5 is a diagram of a user interface for a cloud-services management tool, in accordance with certain embodiments.

FIG. 5 shows an example image of a GUI that may be displayed to one or more users accessing cloud-services management tool 101. As shown in FIG. 5, page 500 may be displayed. Page 500 includes a dashboard for the cloud-services management tool 101. In certain embodiments, the user may select "Datasources" from the "My Components" dropdown menu described with respect to FIG. 3. A datasource may represent a source of data for performing a workload, for example. In response to the user selection, page 500, "My Datasources," may be displayed. Page 500 may include one or more buttons, or other like user interfaces, for selecting different options for managing datasources (e.g., adding, starting, stopping, creating safe point, editing). For example, button 502 enables the user to select one or more parameters for the datasource via a pop-out menu. The pop-out menu may enable the user to edit one or more parameters for the datasource. The pop-out menu may be similar to the pop-out menu 404 as described with respect to FIG. 4, for example. In certain embodiments, in response to the user selecting a button that indicates the datasource should be added (e.g., "Submit," or the like), the cloud-services management tool 101 may generate a first set of tags and a second set of tags for the datasource, where the first set of tags is specified by the entity and the second set of tags is based on terminology of the cloud provider providing the datasource. In a non-limiting example, the cloud-services management tool 101 transmits a command including data of the second set of tags to the cloud provider to allocate the datasource.

In various embodiments, page 500 may include a list of datasources that the user has access to in a menu 504. The menu 504 may include a name of each datasource of the list of datasources as well as a status (e.g., stopped, running) of the datasource. The user may select a datasource from the menu 504 to view details of the datasource in a viewing area 506. The details displayed in the viewing area 506 may include the parameters for the datasource, for example. The parameters may include a name, a group of the entity having access rights, a status, a type, a version, one or more parameters for a processor, a disk capacity, one or more users having access rights, a hyperlink providing access, one or more of a date or a time when the datasource was created, or other like parameters. In a non-limiting example, the parameters displayed are specified by the entity.

Figure 6:
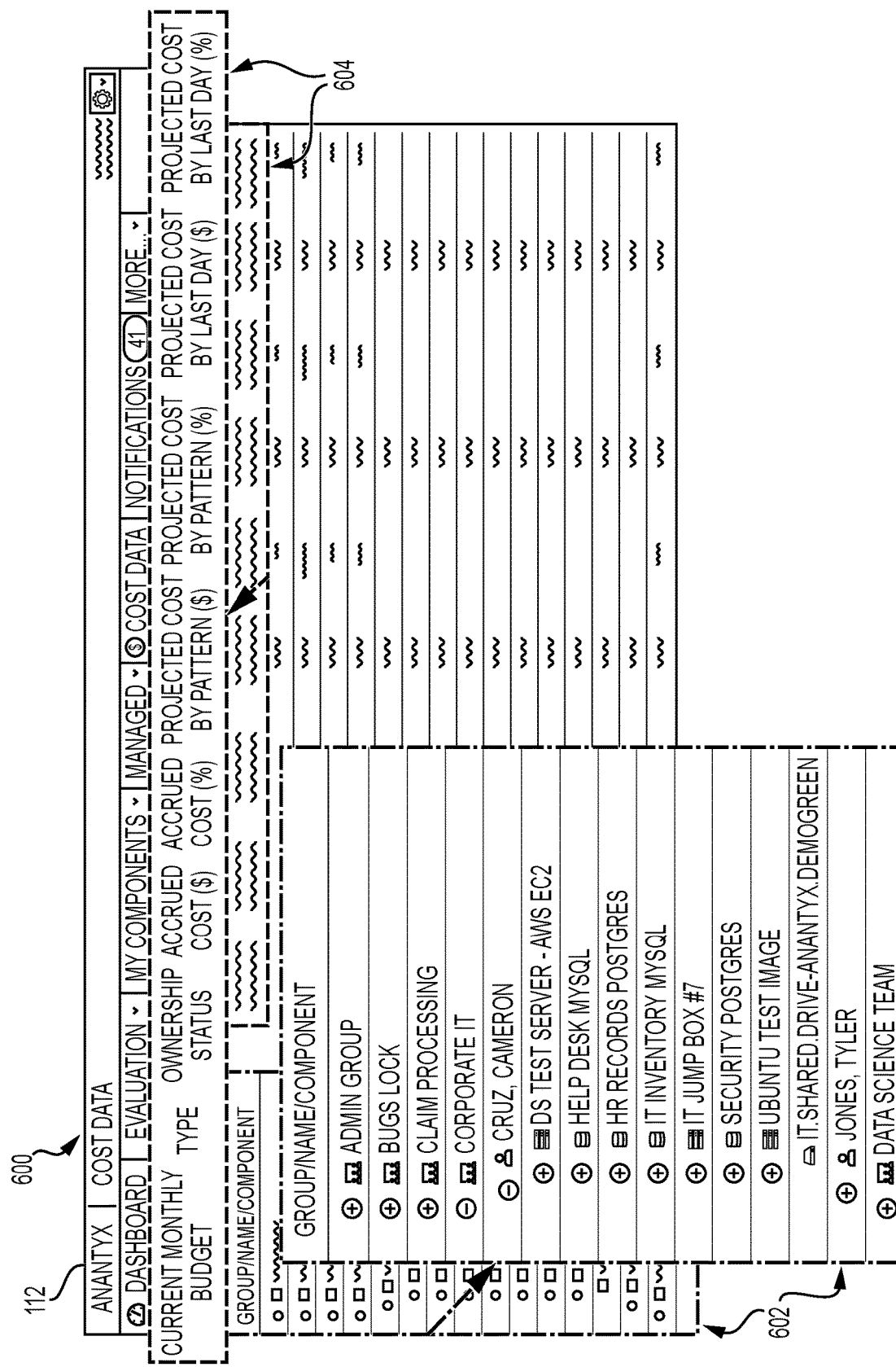
FIG. 6 is a diagram of a user interface for a cloud-services management tool, in accordance with certain embodiments.

FIG. 6 shows an example image of a GUI that may be displayed to one or more users accessing cloud-services management tool 101. As shown in FIG. 6, page 600 may be displayed. Page 600 includes the dashboard for the cloud-services management tool 101. In a non-limiting example, the user may select "Cost Data" from the interactive tabs described with respect to FIG. 3. Cost data may include accrued and/or predicted cloud costs by services, individual, entity, projects, or other like logical groupings specified by the entity. A user having administrative privileges may specify the logical groupings, for example. The entity may use the cost data for budgeting, cost allocation, or other purposes, for example. In response to the user selection, page 600, "Cost Data," may be displayed.

In certain embodiments, page 600 may include a list of one or more groups, names, or technology resources that the user has access to in a menu 602. The list may be based on the access level of the user, for example. In a non-limiting example, the menu 602 may include one or more groups of the entity. The user may be able to expand each of the groups to view one or more users of the group. The user may further expand each user of the group to view a list of technology resources to which each user of the group has access. In another non-limiting example, the menu 602 may be organized based on the list of technology resources. Page 600 may include a view area for displaying budget data for each item of the list displayed in the menu 602. The view area may include column headings 604, for example. In a non-limiting example, the column headings 604 are specified by the entity.

In various embodiments, the cloud-services management tool 101 determines one or more costs associated with the entity, user groups of the entity, individual users of the entity, one or more technology resources of the entity, or a combination thereof for display in the viewing area. 12. In a non-limiting example, the cloud-services management tool 101 compares the one or more costs to the budget data and causes display of a notification to a list of notifications based on the comparison. The list of notifications may be displayed in a tab interface of the dashboard, for example. In a non-limiting example, the notification may include a hyperlink that enables the user to switch to a tab of the dashboard to manage one or more technology resources to modify the one or more costs. For example, the user may de-activate one or more technology resources or re-distribute one or more technology resources between the cloud providers 122, 124, 126.

The cloud-services management tool 101 enables a user to view real-time costs of technology resources by business unit, business user, projects, or other logical groups specified by the entity using a single user interface that incorporates costs of each authorized cloud provider of the cloud providers 122, 124, 126.

Figure 7:
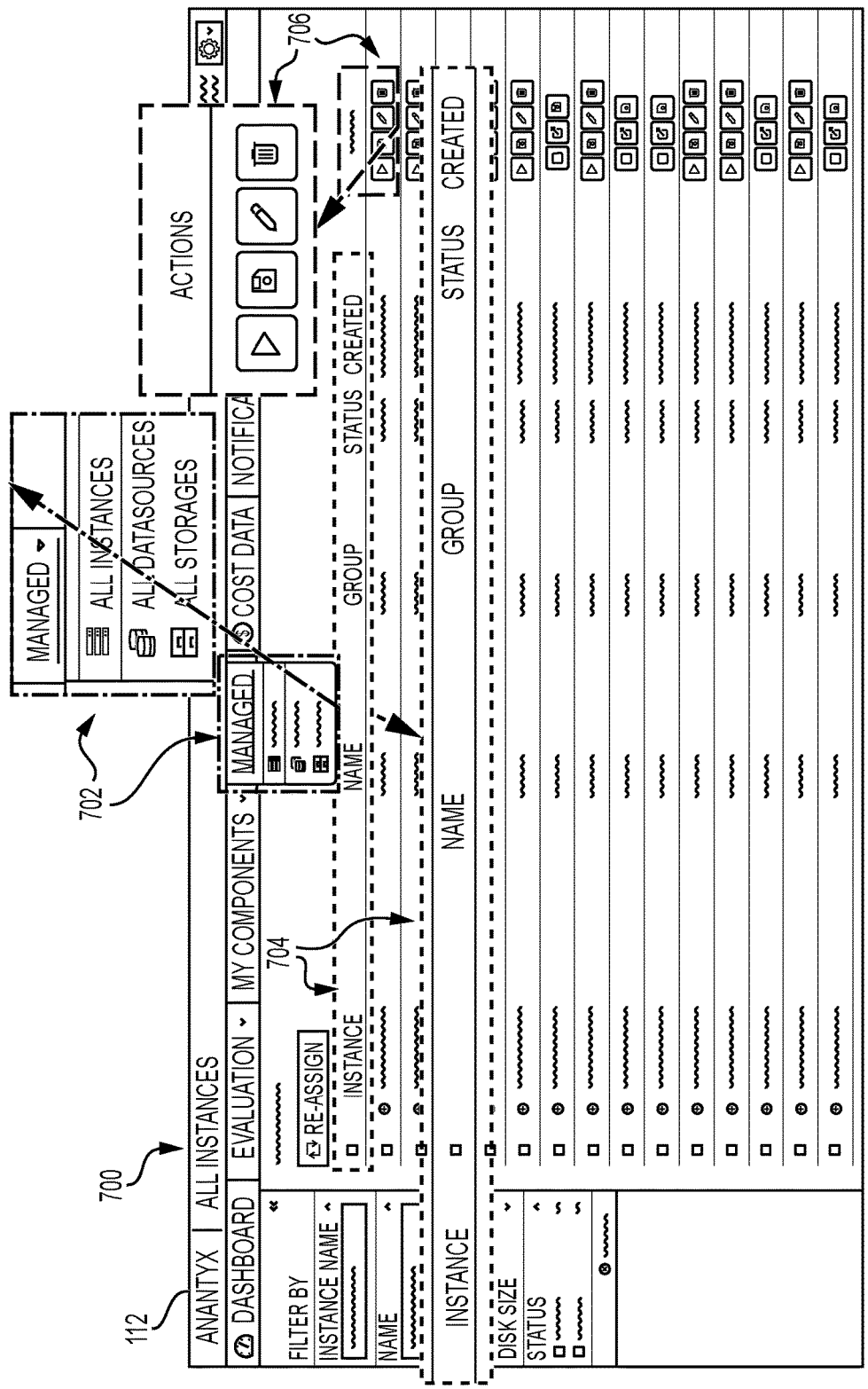
FIG. 7 is a diagram of a user interface for a cloud-services management tool, in accordance with certain embodiments.

FIG. 7 shows an example image of a GUI that may be displayed to one or more users accessing cloud-services management tool 101. As shown in FIG. 7, page 700 may be displayed. Page 700 includes the dashboard for the cloud-services management tool 101. In a non-limiting example, the user may select "Managed" from the interactive tabs described with respect to FIG. 3. In response to selecting the Managed tab, the cloud-services management tool may cause display of a dropdown menu 702. The dropdown menu 702 may include a list of technology resources, such as instances, datasources, storages, or other technology resources managed by the user.

In a non-limiting example, the user may select "All Instances." In response to the user selection, the user may be able to view all instances managed by the user. The view may include column headings 704. Column headings 704 may be specified by the entity, for example. The user may be able to manage the instances using actions 706.

In certain embodiments, using actions 706 the user may start an instance, stop an instance, edit an instance, delete an instance, create a safe point, or other specified actions, where the specified actions are based on the access level of the user. In various examples, in response to the user selecting a button that indicates a specified action, the cloud-services management tool 101 transmits a command including data of a set of tags that are based on terminology of the cloud provider to the cloud provider to perform the specified action for the instance. For example, in response to the user selecting a button, or other like interface, that indicates the instance should be deleted, the cloud-services management tool 101 transmits a command including data of a set of tags that are based on terminology of the cloud provider to the cloud provider to de-allocate the instance. The "All Instances" tab enables the user to manage services provided by different cloud providers 122, 124, 126 through a single user interface that is not specific to any one of the cloud providers 122, 124, 126, or stated in another way, that is independent of terminology specific to a single cloud provider.

Figure 8:
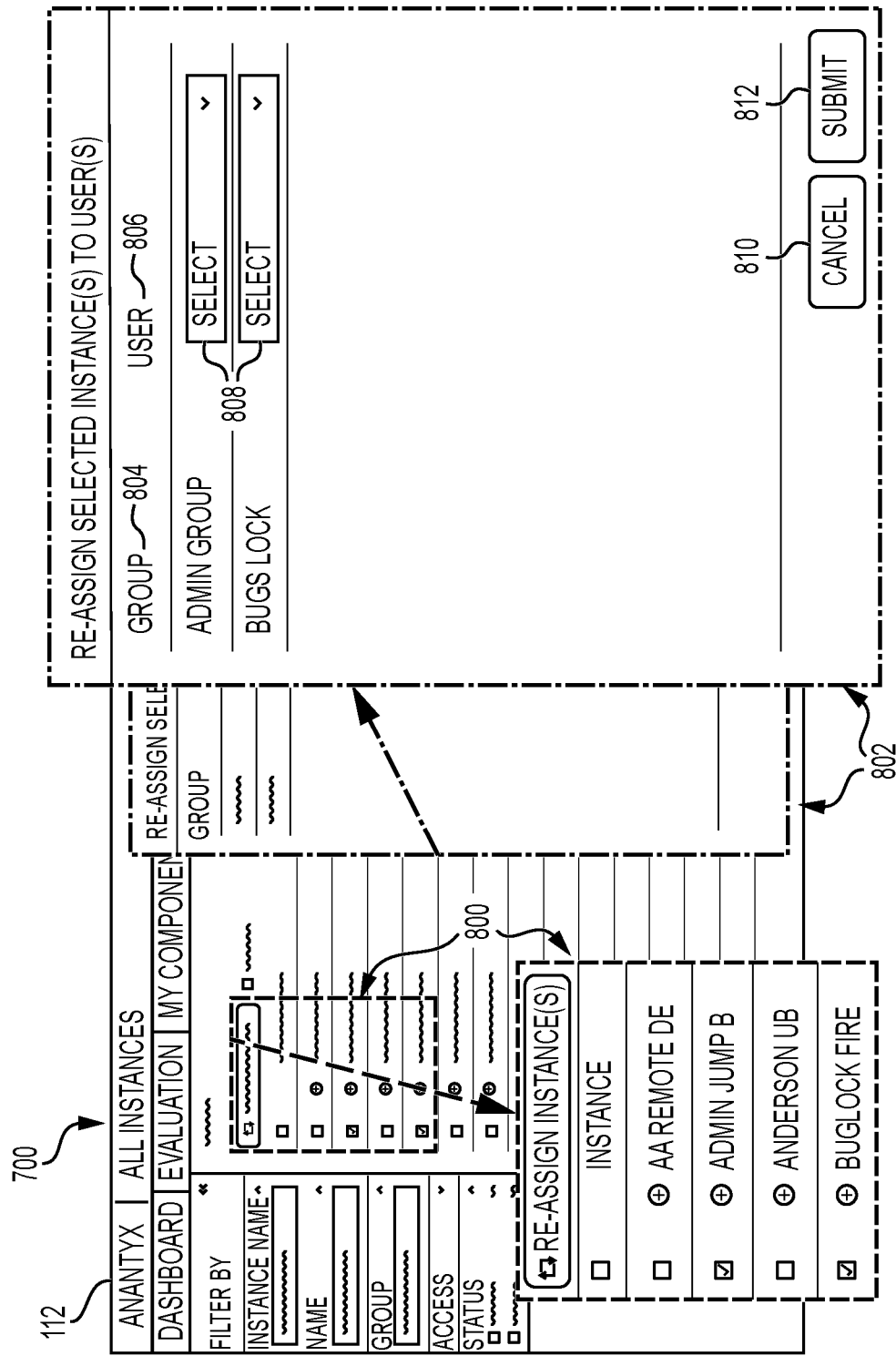
FIG. 8 is a diagram of a user interface for a cloud-services management tool, in accordance with certain embodiments.

FIG. 8 shows an example image of a GUI that may be displayed to one or more users accessing cloud-services management tool 101. In certain embodiments, the cloud-services management tool 101 causes the pop-out menu 802 to display in response to the user selecting one or more instances and an option to re-assign the one or more instances, as shown in area 800. In response to the user selection indicating to re-assign the one or more instances, pop-out menu 802 may be displayed over page 700. The pop-out menu 802 may include one or more of a group heading 804 or a user heading 806. Using dropdown menus 808, the user may re-assign the one or more instances. In certain embodiments, in response to the user selecting the button 810, "Cancel," the pop-out menu 802 is closed without any further action. In other embodiments, in response to the user selecting the button 812, "Submit," the cloud-services management tool 101 may edit a first set of tags and a second set of tags for the one or more instances, where the first set of tags is specified by the entity and the second set of tags is based on terminology of the cloud provider providing the instance.

In other embodiments, the user may select "Datasources," "Storages," or other available technology resources from the "Managed" tab interface. In response to the user selection, the user may be able to view the respective available technology resources managed by the user. The view may include column headings similar to column headings 704 as described with respect to FIG. 7. The user may be able to manage the available technology resources using actions similar to actions 706 as described with respect to FIG. 7. In a non-limiting example, the user may re-assign the available technology resources by selecting one or more of the available technology resources and selecting a re-assign option, as described with respect to FIG. 8. The "Managed" tab interface enables the user to manage services provided by different cloud providers 122, 124, 126 through a single user interface that is not specific to any one of the cloud providers 122, 124, 126. The "Managed" tab enables the user to manage services independent of terminology specific to a single cloud provider 122, 124, 126 and without the user needing to individually access different tools specific to cloud providers 122, 124, 126.

Figure 9:
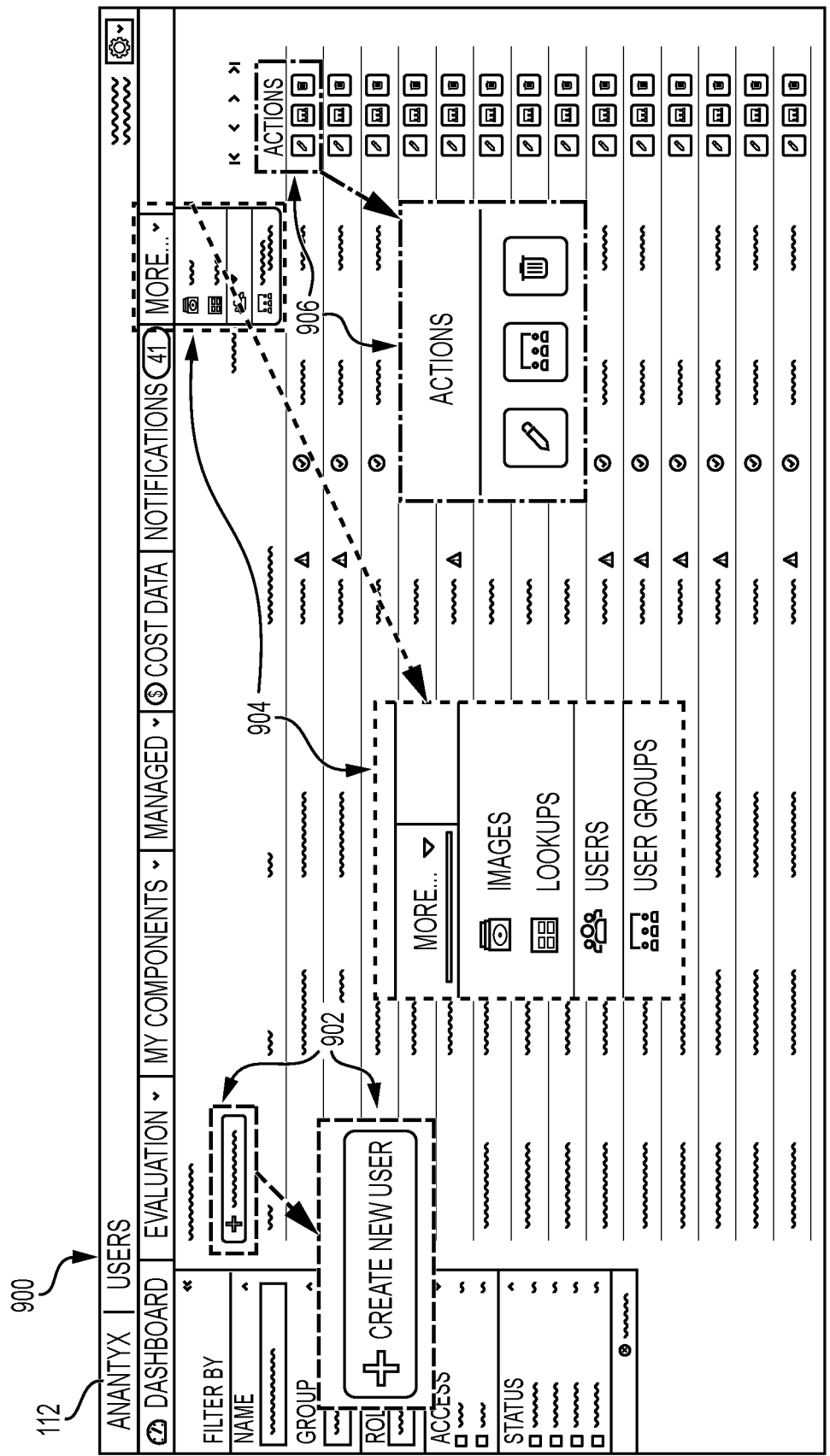
FIG. 9 is a diagram of a user interface for a cloud-services management tool, in accordance with certain embodiments.

FIG. 9 shows an example image of a GUI that may be displayed to one or more users accessing cloud-services management tool 101. As shown in FIG. 9, page 900 may be displayed. In a non-limiting example, the cloud-services management tool 101 causes page 900 to display in response to the user selecting menu option 904, "Users," from the "More" interactive tab described with respect to FIG. 3. In certain embodiments, page 900 includes a button 902, or other like interface, that enables the user to create a new user. In a non-limiting example, the cloud-services management tool 101 may cause a pop-out menu to display. The pop-out menu may enable the user to add an authorized user of the cloud-services management tool 101 by providing fields for one or more of a username, an email, a group, a role, or other like identifying information.

In various embodiments, the cloud-services management tool 101 manages one or more authorized users of at least one technology resource allocated based on a user selection of an action 906. In a non-limiting example, using actions 906, the user may edit an authorized user, manage one or more groups or roles to which the authorized user is assigned, delete the authorized user, or other specified actions, where the specified actions are based on the access level of the user. The "User" page 900 enables the user to manage access rights for the authorized user to services provided by different cloud providers 122, 124, 126 through a single user interface without having to interact with multiple, different cloud provider-specific interfaces.

Figure 10:
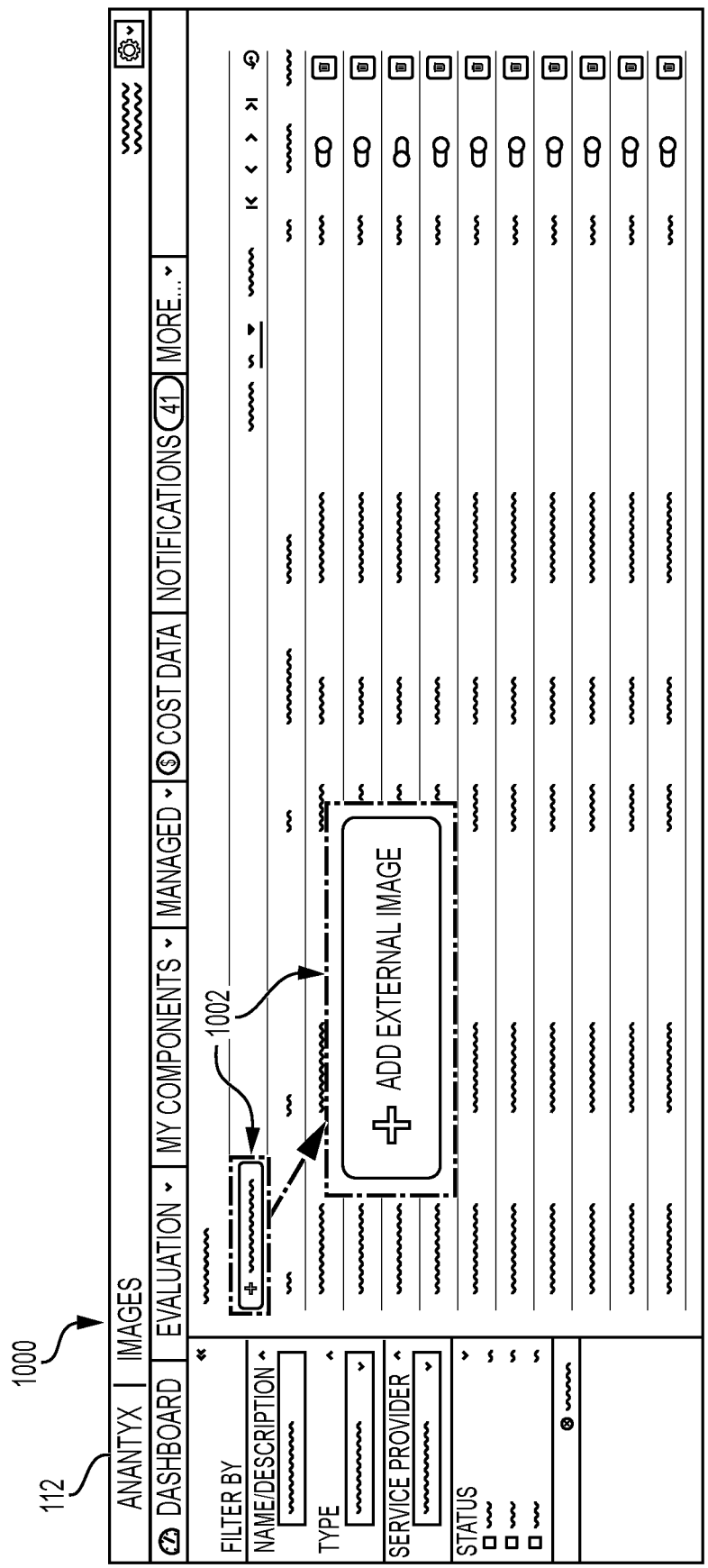
FIG. 10 is a diagram of a user interface for a cloud-services management tool, in accordance with certain embodiments.

FIG. 10 shows an example image of a GUI that may be displayed to one or more users accessing cloud-services management tool 101. As shown in FIG. 10, page 1000 may be displayed. In a non-limiting example, the cloud-services management tool 101 causes page 1000 to display in response to the user selecting menu option (e.g., "Images," or other like descriptor) from the "More" interactive tab described with respect to FIG. 3. In certain embodiments, page 1000 includes a button 1002, or other like interface, that enables the user to add (e.g., create, allocate) a new image (e.g., machine image, virtual machine).

In certain embodiments, the cloud-services management tool 101 may cause a pop-out menu to display. The pop-out menu may enable the user to add the image by providing fields for one or more of an identifier, a name, a type, a cloud provider, a description, or other like identifying information. In a non-limiting example, in response to the user selecting a button, or like interface, indicating to add the image, the cloud-services management tool 101 may generate a first set of tags and a second set of tags for the image, where the first set of tags is specified by the entity and the second set of tags is based on terminology of the cloud provider providing the image. In a non-limiting example, the cloud-services management tool 101 transmits a command including data of the second set of tags to the cloud provider to allocate the image.

Figure 11:
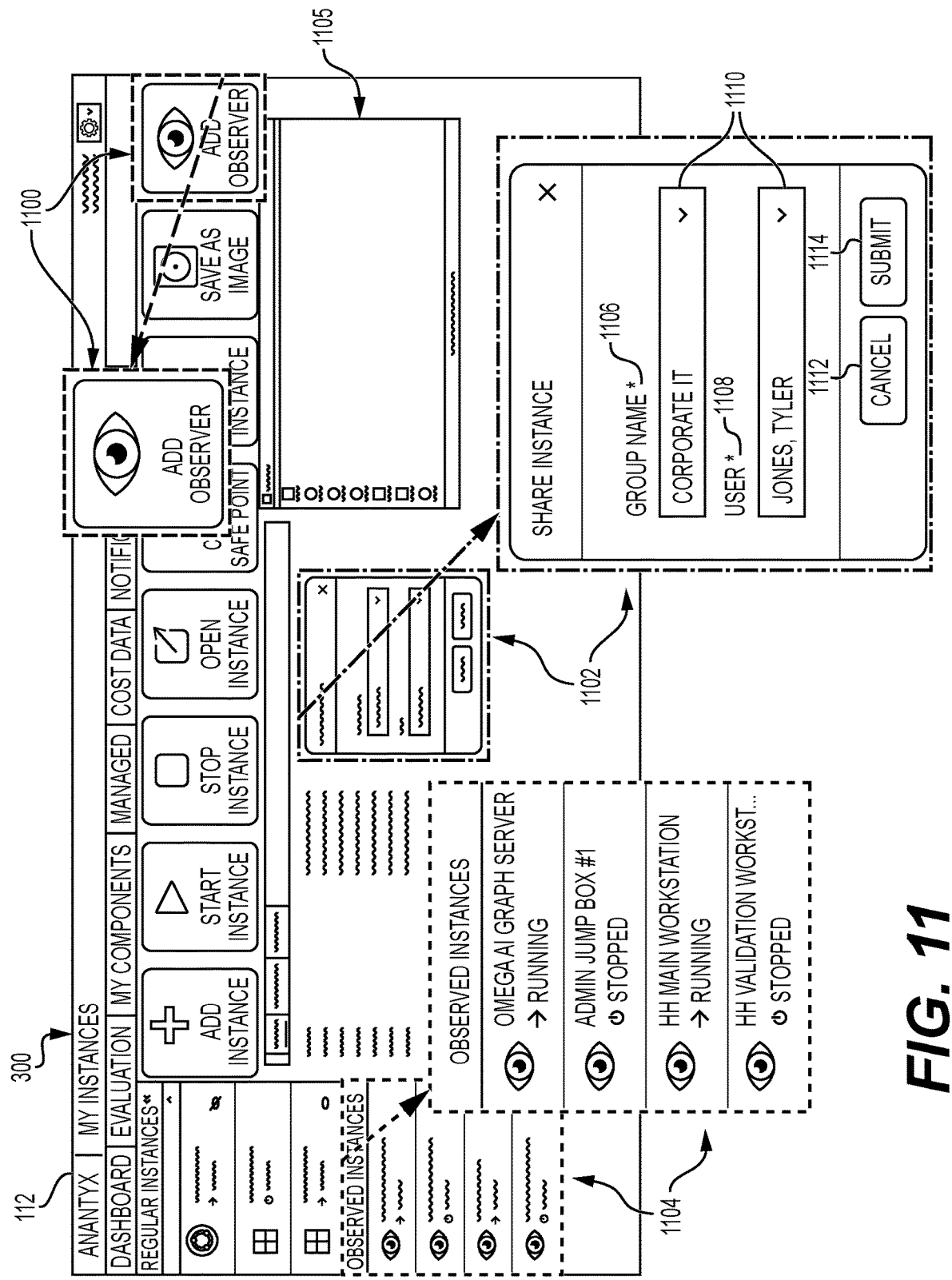
FIG. 11 is a diagram of a user interface for a cloud-services management tool, in accordance with certain embodiments.

FIG. 11 shows an example image of a GUI that may be displayed to one or more users accessing cloud-services management tool 101. As shown in FIG. 11, page 300 may be displayed, as described with respect to FIG. 3. In certain embodiments, page 300 includes a button 1100, or other like interface, that enables the user to add a new observer for an instance. An observer is a user who has been granted permission to view actions on another user's managed instance. A user having administrative privileges or the user with the managed instance may grant the permission, for example.

In certain embodiments, in response to the user interacting with the button 1100, the cloud-services management tool 101 may cause a pop-out menu 1102 to display. The pop-out menu 1102 may include one or more fields for identifying the observer, such as a group name 1106, a role, a user name 1108, or other like identifying information. The user may select the identifying information using dropdown menus 1110, or other like menus. In certain embodiments, in response to the user selecting the button 1112, "Cancel," the pop-out menu 1102 is closed without any further action. In other embodiments, in response to the user selecting the button 1114, "Submit," the cloud-services management tool 101 may edit one or more of a first set of tags or a second set of tags for the instance, where the first set of tags is specified by the entity and the second set of tags is based on terminology of the cloud provider providing the instance. For example, editing the first set of tags may associate the observer with the second set of tags, where the second set of tags enable access to the instance using a specified identifier that is independent of the observer. By enabling observers, the cloud-services management tool 101 enables access to the instance for multiple authorized users through a single user interface without each user of the multiple authorized users having to interact with the cloud provider-specific interface for the instance.

In various embodiments, page 300 includes a list of observed instances that the user has access to in a menu 1104. The menu 1104 may include a name of each instance of the list of observed instances as well as a status (e.g., stopped, running) of the observed instance. The user may select an observed instance from the menu 1104 to view details of the observed instance in a viewing area of page 300. In a non-limiting example, the user may select an instance for preview. The cloud-services management tool 101 may cause a preview of the instance to display in a preview area 1105. In other examples, the cloud-services management tool 101 may cause the instance to open in a new page or in a pop-out window.

Figure 12:
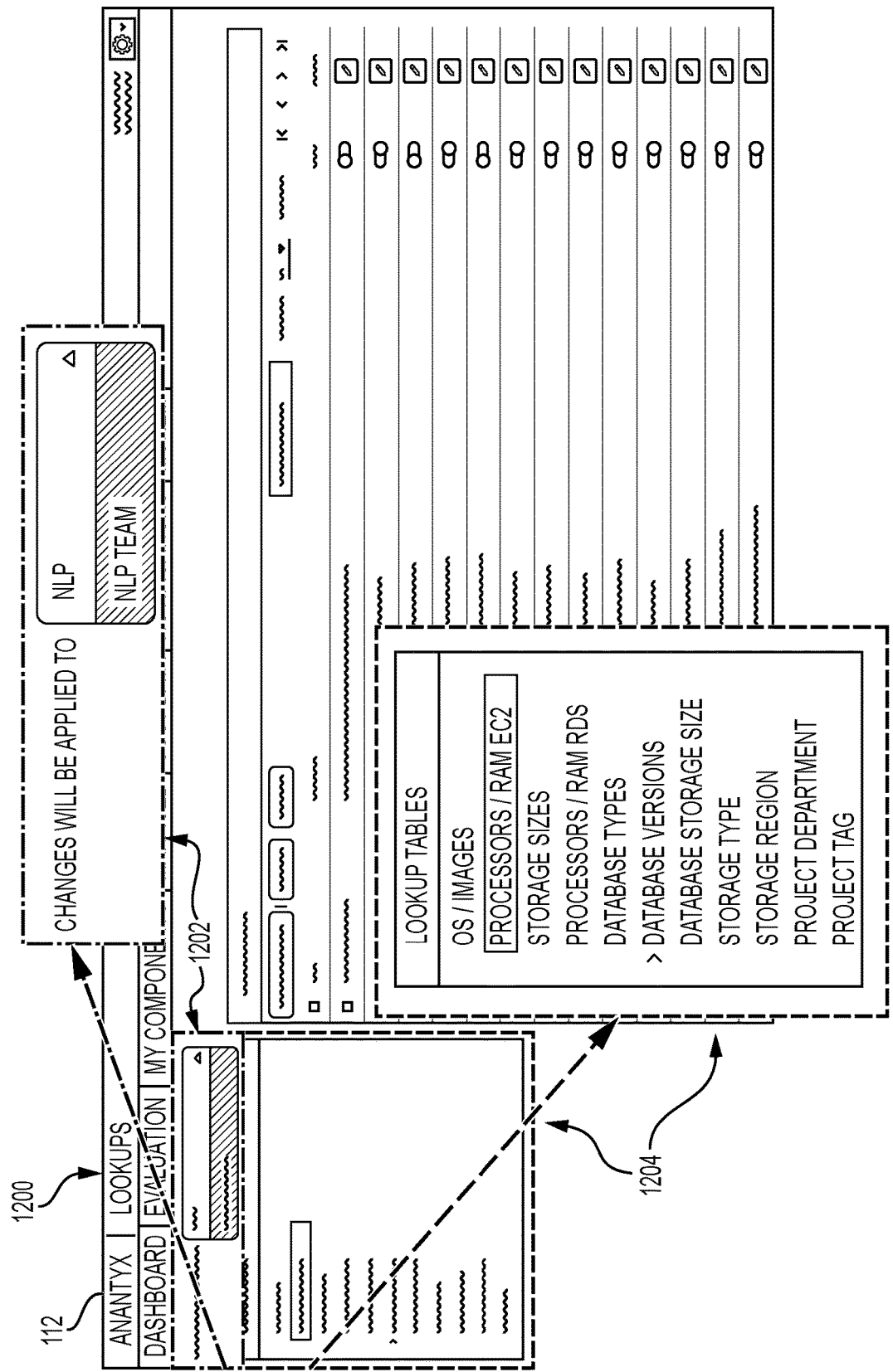
FIG. 12 is a diagram of a user interface for a cloud-services management tool, in accordance with certain embodiments.

FIG. 12 shows an example image of a GUI that may be displayed to one or more users accessing cloud-services management tool 101. As shown in FIG. 12, page 1200, "Lookups," may be displayed. In certain embodiments, in response to a determination that the user has an access level that enables the user to add, delete, or modify one or more of the list of available technology resources specified in service agreements with each cloud provider, the cloud-services management tool 101 may cause display of page 1200. The determination may be made when the user logs into the cloud-services management tool 101, for example. In a non-limiting example, the dashboard may include a tab interface that the user may select to view page 1200. In another non-limiting example, the user may select an option from a dropdown menu, such as the "More" tab, to view page 1200.

In certain embodiments, page 1200 includes a dropdown menu 1202, or other like interface, that enables the user to modify access to one or more technology resources for a group, a role, or other like logical collection of authorized users for an entity. Page 1200 may also include a menu 1204. The menu 1204 may provide access to a lookup table, or other database, storing information for the entity. The information may include one or more of the list of technology resources, tags associated with each technology resource of the list of technology resources, users, groups, roles, or other like data. For example, the menu 1204 may include categories for one or more of images, processors/RAM EC2, processors/RAM RDS, storage capacity, database types, database versions, database storage capacity, storage type, storage region, project department, project tag, or other like groupings specified by the entity.

In various embodiments, in response to the user selecting a category of menu 1204, the cloud-services management tool causes display of items within the category to page 1200. Page 1200 may include a viewing area for display of value, a description, a status indication, or other like information. In a non-limiting example, the status indication may include an interactive slider, one or more buttons, or other like interface, that enables the user to activate or de-activate the item. In another non-limiting example, page 1200 may include a button, or other like interface, that enables the user to edit the item. In certain embodiments, page 1200 includes a button, or other like interface that enables the user to add items to the category displayed in the viewing area. In a non-limiting example, the cloud-services management tool causes display of a pop-out menu (e.g., pop-out menu 404, pop-out menu 802, pop-out menu 1102, or other similar pop-out menus) that enables the user to add the item.

FURTHER EMBODIMENTS AND EXAMPLE IMPLEMENTATIONS

In certain embodiments, a method allows a business user to access, monitor, and manage one or more cloud services providing a plurality of distinct cloud computing systems. The method may be the computer-implemented method 200, for example. The method can include displaying, via a computing device (e.g., client devices 110, 116), a business user web interface (e.g., user interface, GUI) including a list of the one or more cloud services available to the business user and provided by the plurality of distinct cloud computing systems (e.g., provided by cloud providers 122, 124, 126), where the list is presented in general computing terminology that is custom configured and accompanied by plain language descriptions (e.g., terminology provided by the entity), and displaying, via the computing device, a further business user web interface including a customized list of services for the business user, where the customized list of services is provided via predefined machine images (e.g., virtual machines), database setups, customized cloud services, or a combination thereof. The method can further include providing controls to the business user to access and manage the one or more cloud services simultaneously, displaying a real-time cost of cloud resources grouped by the business user, one or more business units, one or more projects, or a combination thereof, where the real-time cost includes a cost of one or more service components (e.g., technology resources), and setting, via the business user web interface or the further business user web interface, a budget for the business user, the one or more business units, the one or more projects, or a combination thereof for a billing period. In some embodiments, the method can further include comparing an actual cost to the budget for the billing period, and displaying an estimated cost of ownership for cloud services based upon a set of services needed for the one or more projects or the one or more business units, where the estimated cost of ownership is determined through price estimates retrieved from one or more cloud providers or one or more corporate information technology catalogs.

In further embodiments, the method can include adding and/or removing the business user to the one or more business units, setting the budget for the business user, monitoring cloud services use by the business user, monitoring a use of the budget of the member, or a combination thereof via a business manager user interface, managing cloud resources provisioned to and/or managed by a member of the one or more business units via the business manager user interface, reassigning a cloud service privilege from a member of the one or more business units to a further member of the one or more business units via the business manager user interface, or a combination thereof.

In various embodiments, the method can additionally include creating and/or and managing a catalog of the one or more cloud services offered through the business user interface or further business user interface via a system administrator user interface, adding one or more further business users, one or more business units, one or more projects, one or more cloud spaces (e.g., GOOGLE CLOUD VIRTUAL PRIVATE CLOUD (VPC), MICROSOFT AZURE VIRTUAL NETWORK (VNet), AMAZON VPC, etc.), one or more machine images, or a combination thereof into the catalog of the one or more cloud services, and providing and/or prohibiting one or more business units and/or one or more projects utilization of one or more of the one or more cloud services, one or more cloud spaces, one or more machine images, or a combination thereof. In a non-limiting example, the catalog may list cloud services using terminology provided by the authorized cloud-service providers.

In certain embodiments, the method allows a business user to login and share views of one or more cloud virtual machines and one or more data storages through a user interface. The method can include inputting, via a computing device, login credentials to access the one or more cloud virtual machines and/or the one or more data storages via the user interface, where the login credentials are input without a communication protocol, and sharing access of a virtual machine screen with one or more further users within the user interface, where sharing access of a virtual machine screen is performed without external screen sharing software.

In further embodiments, a method for implementing elements of cloud governance while providing a business user with cloud management self-service capabilities through a user web interface is disclosed herein. The method can include generating and providing, via an implemented Cloud Tagging Strategy, one or more free tags entered by a business user and/or one or more hidden required tags to a down-stream system component, controlling available cloud services for one or more business units, where the available cloud services are selectable in the user web interface, implementing login credentialing for the user web interface, where the login credentialing enables access to one or more provisioned cloud services without provisioning the business user in each individual cloud management portal, generating one or more custom sets of machine images to be available to the one or more business unit, where the one or more custom sets of machine images enable access to one or more serverless cloud services, one or more commercial-off-the-shelf (COTS) products, one or more open-source applications, one or more data sets, or a combination thereof, and prohibiting the business user from downloading and/or uploading data, code, digital artifacts, or a combination thereof from/to one or more individual computing devices of the business user that reside outside of a corporate cloud.

In some embodiments, a method for generating one or more RESTful calls and one or more JSON file format outputs to send information to one or more downstream components that is necessary and sufficient to self-manage cloud services offered by a plurality of cloud providers is additionally disclosed herein. The method can include collecting business user-generated cloud tags, and input-based programmatically generated tags to be used in generating the one or more RESTful calls and the one or more JSON files that are used to manage cloud services via a user web interface and one or more data entry fields of the user web interface, and generating the one or more RESTful calls and the one or more JSON files that are sent to the one or more downstream components to self-manage cloud services via a JavaScript capability of the user web interface.

From the foregoing, it can be appreciated that specific embodiments of the disclosure have been described herein for purposes of illustration, but that various modifications can be made without deviating from the disclosure. In addition, many of the elements of one embodiment can be combined with other embodiments in addition to or in lieu of the elements of the other embodiments. Accordingly, the technology is not limited except as by the appended claims.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A cloud-services management tool for managing cloud services of an entity, the cloud-services management tool comprising:
    a processor;
    a storage device communicatively coupled to the processor, the storage device to store computer-executable instructions, which, when executed by a processor, cause the processor to:
        cause, via a display device, display of a user interface including one or more lists of available technology resources based on a user of the entity;
        receive, via a network interface, a user selection including at least one technology resource from the one or more lists of available technology resources;
    generate a first set of tags and a second set of tags for the at least one technology resource, wherein the first set of tags includes plain language descriptions of the at least one technology resource specified by the entity and the second set of tags includes terminology specific to at least one cloud service of at least one cloud-service provider;
        determine the at least one technology resource is available from at least one cloud-service provider of a list of cloud-service providers, the list of cloud-service providers authorized by the entity; and
        manage the at least one technology resource that is available from at least one cloud-service provided by the at least one cloud-service provider based on the user selection, including causing one or more commands to be transmitted to the at least one cloud-service provider using the second set of tags.

2. The cloud-services management tool of claim 1, wherein the one or more lists of available technology resources includes one or more of machine images, database setups, cloud services, or a combination thereof.

3. The cloud-services management tool of claim 1, wherein the computer-executable instructions which cause the processor to manage the at least one technology resource includes causing the at least one cloud-service provider to allocate the at least one cloud-service, to deallocate the at least one cloud service, or to display data of the at least one technology resource available from a cloud service via the user interface.

4. The cloud-services management tool of claim 1, wherein the computer-executable instructions cause the processor to:
    manage one or more authorized users of the at least one technology resource allocated based on the user selection, wherein managing the one or more authorized users is performed exclusively in the cloud-services management tool.

5. The cloud-services management tool of claim 4, wherein the at least one technology resource is a virtual machine; and wherein the user interface further includes a display of the virtual machine to the one or more authorized users without a separate screen-sharing application.

6. The cloud-services management tool of claim 1, wherein the one or more lists of available technology resources includes a first list of available technology resources of the list of cloud-service providers utilized by the entity and a second list of available technology resources utilized by the entity; and wherein the computer-executable instructions cause the processor to:
    receive, via a network interface, authenticating information of the user;
    determine a user access based on the authentication information; and
    cause, via the display device, display of the first list in response to the user access indicating a first access level or the second list in response to the user access indicating a second access level.

7. The cloud-services management tool of claim 6, wherein the first list describes available cloud services using terminology provided by an authorized cloud service provider and the second list describes available cloud services using terminology provided by the authorized cloud service provider.

8. The cloud-services management tool of claim 1, wherein the computer-executable instructions cause the processor to:
    determine a projected monthly cost of the at least one technology resource allocated; and
    cause, via the display device, display of the projected monthly cost for groups of diverse cloud services and individual technology resources.

9. The cloud-services management tool of claim 8, wherein the user interface further includes cost data for the entity; and wherein the computer-executable instructions cause the processor to:
    determine one or more costs associated with the entity, user groups of the entity, individual users of the entity, one or more technology resources of the entity, or a combination thereof; and
    cause, via the display device, display of the one or more costs for groups of cloud services bundled in an individual technology resource.

10. The cloud-services management tool of claim 9, wherein the user interface further includes budget data for the entity.

11. The cloud-services management tool of claim 10, wherein the user interface further includes a list of notifications, and wherein the computer-executable instructions cause the processor to:
    compare the one or more costs to the budget data; and
    cause, via the display device, display of a notification to the list of notification based on the comparison.

12. The cloud-services management tool of claim 2, wherein the lists are defined and managed by the entity to include plain language descriptions of the available technology resources independent from terminology specific to the cloud-service providers.

13. A computer-implemented method for managing cloud-services of an entity, the method comprising:
  causing, via a display device, display of a user interface including one or more lists of available technology resources based on a user of the entity;
  receiving, via a network interface, a user selection including at least one technology resource from the one or more lists of available technology resources;
  generating a first set of tags and a second set of tags for the at least one technology resource, wherein the first set of tags includes plain language descriptions of the at least one technology resource specified by the entity and the second set of tags includes terminology specific to the at least one cloud-service provider;
  determining, with at least one processor, the at least one technology resource is available from at least one cloud-service provider of a list of cloud-service providers authorized by the entity; and
  transmitting one or more commands to the at least one cloud-service provider to manage at least one technology resource that is available from the cloud-service provider using the second set of tags.

14. The method of claim 13, further comprising:
  managing one or more authorized users of the at least one technology resource allocated based on the user selection, wherein managing the one or more authorized users is performed exclusively in the cloud-services management tool.

15. The method of claim 14, wherein the at least one technology resource is a virtual machine; and the method further comprising:
  causing the user interface to display of the virtual machine to the one or more authorized users without a separate screen-sharing application.

16. The method of claim 13, wherein the one or more lists of available technology resources includes one or more of machine images, database setups, cloud services, or a combination thereof, and wherein the lists are defined and managed by the entity to include plain language descriptions of the available technology resources independent from terminology specific to the cloud-service providers.

17. A non-transitory computer-readable medium storing computer-executable instructions, which, when executed by a processor, cause the processor to:
  cause, via a display device, display of a user interface including one or more lists of available technology resources based on a user of an entity;
  receive, via a network interface, a user selection including at least one technology resource from the one or more lists of available technology resources;
  generate a first set of tags and a second set of tags for the at least one technology resource, wherein the first set of tags includes plain language descriptions of the at least one technology resource specified by the entity and the second set of tags includes terminology specific to the at least one cloud-service provider;
  determine the at least one technology resource is available from at least one cloud service provided by at least one cloud-service provider of a list of cloud-service providers authorized by the entity; and
  output one or more commands for transmission to the at least one cloud-service provider to manage at least one cloud service available from the technology resource using the second set of tags.

18. The non-transitory computer-readable medium of claim 17, wherein the user is a first user and the entity is a first entity; and wherein the processor is further operable to:
  cause, via the display device, display of a second user interface including one or more lists of available technology resources based on a second user of a second entity;
  receive, via a network interface, a user selection including at least one technology resource from the one or more lists of available technology resources;
  determine the at least one technology resource is available from at least one cloud-service provider authorized by the second entity; and
  manage the at least one technology resource available from a cloud service provided by the at least one cloud-service provider based on the user selection.

19. The non-transitory computer-readable medium of claim 18, wherein the processor is further to:
  generate a third set of tags and a fourth set of tags for the at least one technology resource, wherein the third set of tags includes plain language descriptions of the at least one technology resource specified by the second entity and the fourth set of tags includes terminology specific to the at least one cloud-service provider; and
  transmit one or more commands to the at least one cloud-service provider to manage the at least one technology resource using the fourth set of tags.

20. The non-transitory computer-readable medium of claim 17, wherein the one or more lists of available technology resources includes one or more of machine images, database setups, cloud services, or a combination thereof, and wherein the lists are defined and managed by the entity to include plain language descriptions of the available technology resources independent from terminology specific to the cloud-service providers.

* * * * *